March 3, 1931. R. H. HUMMERT 1,794,960
SPOT LAMP FOR VEHICLES
Filed Sept. 13, 1929
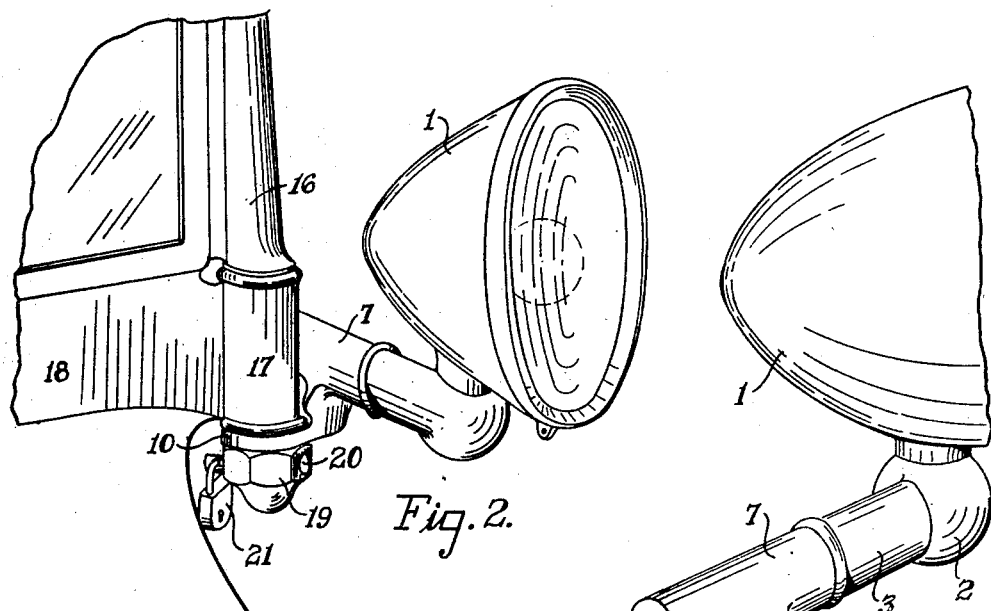
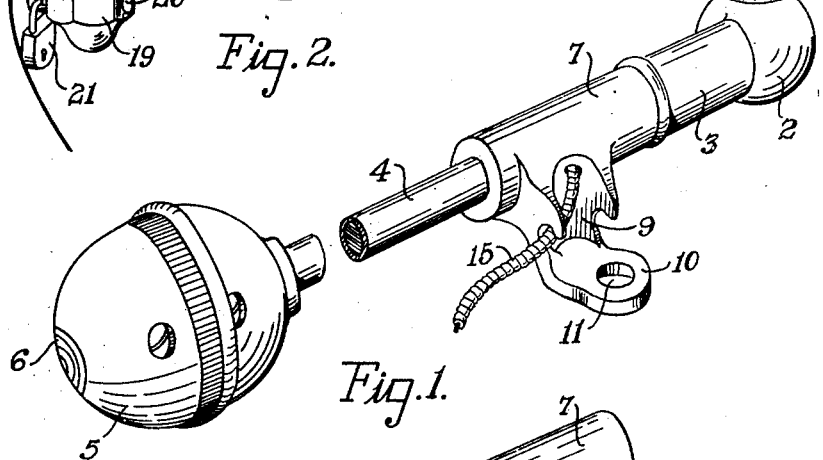
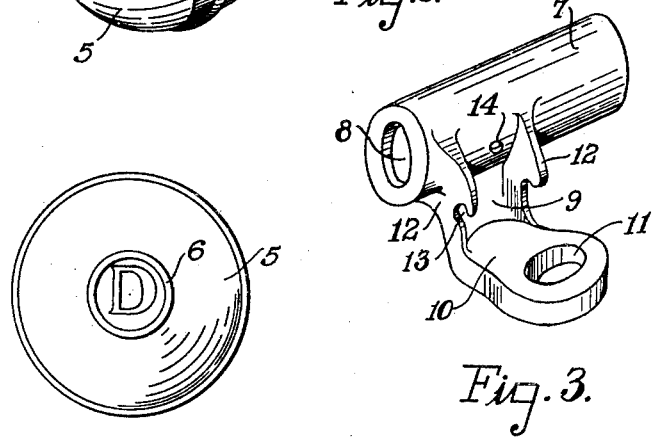
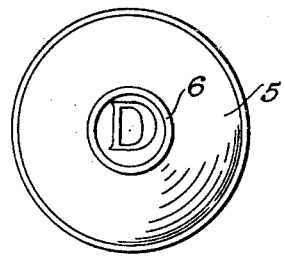
INVENTOR
Robert H. Hummert,
BY Howard S. Smith
ATTORNEY Patented Mar. 3, 1931

1,794,960

UNITED STATES PATENT OFFICE

ROBERT H. HUMMERT, OF DAYTON, OHIO, ASSIGNOR TO THE S. H. THOMSON MANUFACTURING COMPANY, OF DAYTON, OHIO, A CORPORATION OF OHIO

SPOT LAMP FOR VEHICLES

Application filed September 13, 1929. Serial No. 392,355.

This invention relates to new and useful improvements in spot lamps for vehicles.

It is one of the principal objects of my invention to provide extremely simple and attractive bracket means for easily attaching a spot lamp to a vehicle without drilling or tapping holes to receive fastening elements for it. The bracket is particularly adapted for attaching the spot lamp to open cars where the windshield posts are fitted in hollow bosses on the cowl. By merely removing the hex nut from the lower threaded end of a post, the ear on the bracket may be fitted on the post and the nut immediately reapplied to the latter to securely hold the bracket, and the spot lamp carried by it, on the car.

The above operation of attaching the spot lamp to the automobile does not require the drilling or tapping of a hole or holes in any part of the vehicle, since the bracket is applied to an element already on the car, to wit, a windshield post, and is held in place by another existing member such as the hex nut on the lower end of that post.

It is thus possible to send out my spot lamp as an assembled unit ready to put on a vehicle, whereas with other inner-controlled spot lamps it is necessary to take them apart to mount them on the posts of a car.

It is another object of my invention to provide for the spot lamp, a control knob whose rear face bears a suitable monogram.

Other important and incidental objects will be brought out in the following specification and particularly set forth in the subjoined claims.

In the accompanying drawings illustrating my invention, Figure 1 is a perspective view of my spot lamp assembled with the bracket for attachment to the windshield post of an automobile. Figure 2 is a perspective view of the bracket after it has been secured to said post, the lamp and a portion of the cowl and windshield also being shown. Figure 3 is a perspective view of the bracket itself. And Figure 4 is a rear view of the control knob, showing a monogram thereon.

Referring to the accompanying drawings for a detailed description of my invention, the numeral 1 designates a spot lamp housing mounted for horizontal movement upon the ball end 2 of a cylindrical gear housing 3.

Secured to the gear housing 3 is a tube 4 on whose rear end a divided spherical control knob 5 is rotatively mounted. In the rear face of this knob 5 there is molded an insert 6 bearing a monogram,—in this instance the letter "D". This monogram may be of any appropriate kind applied in any suitable manner to the knob.

For the purpose of easily, quickly and firmly attaching the spot lamp assembly, without taking it apart, to an open type of automobile, I have provided the following bracket member. This member preferably comprises a casting 7 of cylindrical form having an axial hole 8 extending entirely through it. Integral with, and projecting outwardly from the outside surface of the rear portion of the member 7, is a lug 9. At its lower end this lug merges into a flat horizontal ear 10 formed with a hole 11. (See Figures 1 and 3.) Formed at each side of the vertical portion of the lug 9 is a flange 12 having a hook shaped recess 13. A hole 14 is formed in the cylindrical portion of the member 7 between the flanges 12, 12 to receive a light wire 15 that passes into the casting 7 from the recess 13 in a flange 12 thereon. (See Figure 1.)

The bracket member 7 is fitted on the tube 4 as shown in Figure 1, to secure the spot lamp assembly to an automobile as illustrated in Figure 2. As shown in the latter figure, the bracket 7 is secured to the lower threaded end of a windshield post 16. This post projects through a hollow boss 17 formed on the cowl 18, and receives on its lower threaded end a hex nut 19.

To attach the bracket 7 to the post 16, it is only necessary to remove the nut 19 and to slide the ear 10 over the exposed part of the post until it engages the lower end of the boss 17. The nut 19 is then applied to the lower threaded end of the post and turned to press the ear 10 on the bracket firmly against the lower end of the boss 17, thus securing the latter, and the lamp assembly which it carries, tightly on the windshield post without drilling or tapping a hole of any kind in it.

For the purpose of locking the spot lamp assembly on the post 16, various means may be employed. In the present instance I provide in the hex nut 19 two radial holes which register with a diametric hole in the post 15 to receive a pin 20 formed with a head on one end and provided in its other end with a hole to receive a padlock 21.

Having described my invention, I claim:

1. A bracket for securing a spot lamp to a vehicle having a downwardly projecting part, comprising a horizontal, tubular member, and a radial ear on said member between its ends for attachment to said downwardly projecting part.

2. A bracket for securing a spot lamp to a vehicle having a downwardly projecting part, comprising a horizontal, tubular member, a lug inclining outwardly from said member between its ends, and a flat horizontal ear on the lower end of said lug, and formed with a hole to fit the downwardly projecting part of said vehicle for the purpose specified.

3. A bracket for securing a spot lamp to a vehicle having a vertical windshield post, comprising a horizontal, tubular member, a downwardly inclined lug on the latter between its ends, a flat, horizontal ear on the lower end of said lug and containing a hole to fit the lower end of the post, and a nut adapted to be applied to the post below the ear for the purpose specified.

4. A bracket for securing a spot lamp to a vehicle having a vertical windshield post, comprising a horizontal, tubular member, an ear on the latter formed with a hole to fit said post, a nut adapted to be applied to said post below the ear, and means for locking said nut to the post after the ear has been attached thereto.

5. The combination with a vehicle having a downwardly projecting windshield post, of a horizontal tubular bracket secured to said post, a tube projecting through said bracket, a lamp housing carried by one end of said tube and a control knob applied to its other end.

In witness whereof I have hereunto set my hand this 11th day of September, 1929.

ROBERT H. HUMMERT.